Oct. 7, 1924.
A. L. BETTS
1,510,582
TANK VEHICLE SAFETY MECHANISM
Filed Sept. 20, 1923    2 Sheets-Sheet 2
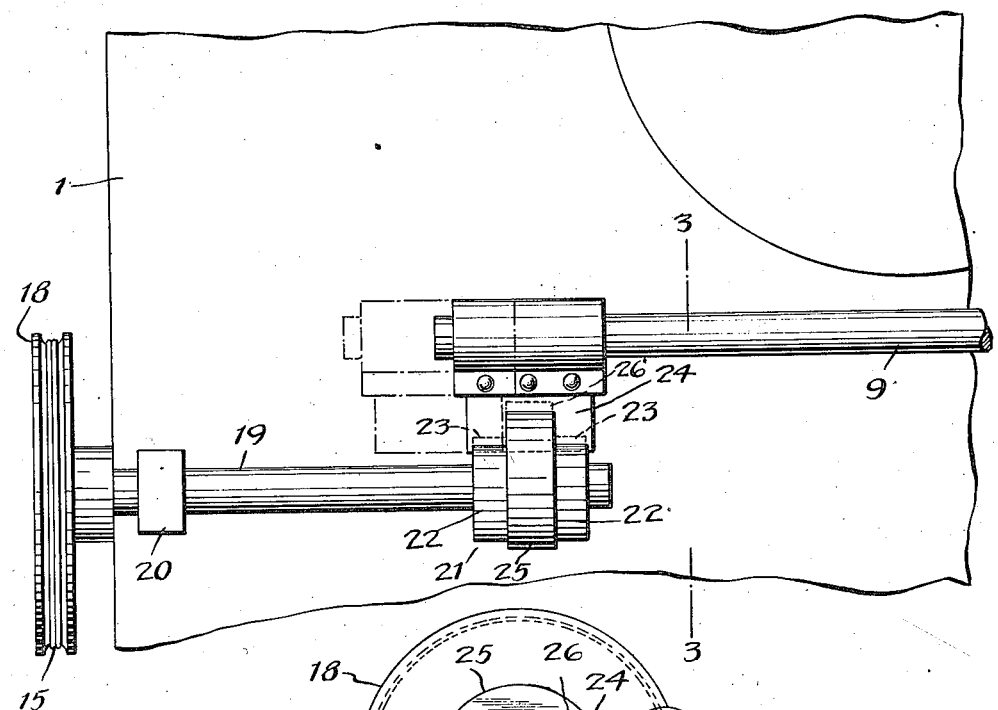
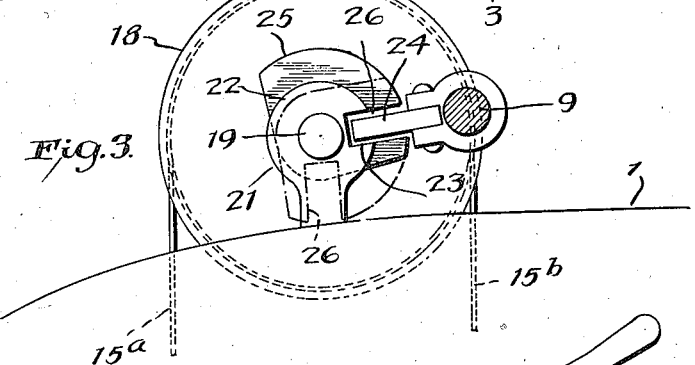
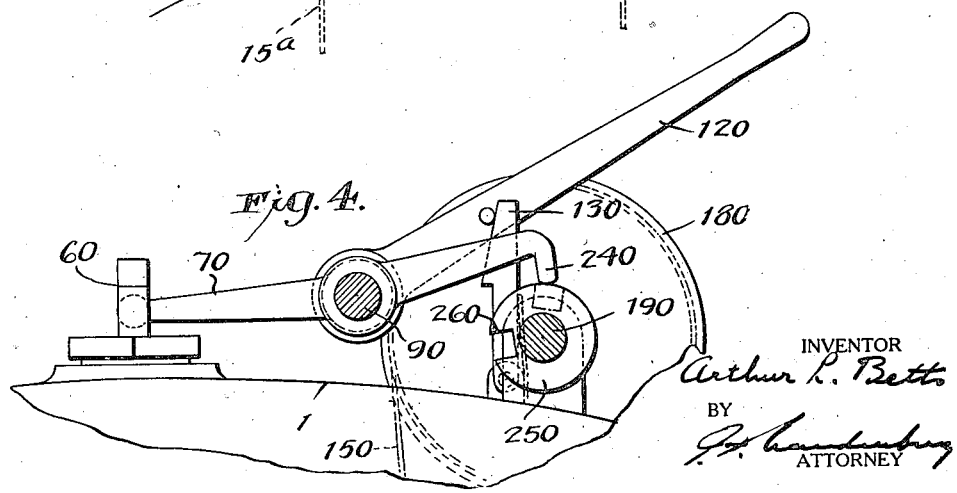
INVENTOR
Arthur L. Betts
BY
ATTORNEY Patented Oct. 7, 1924.

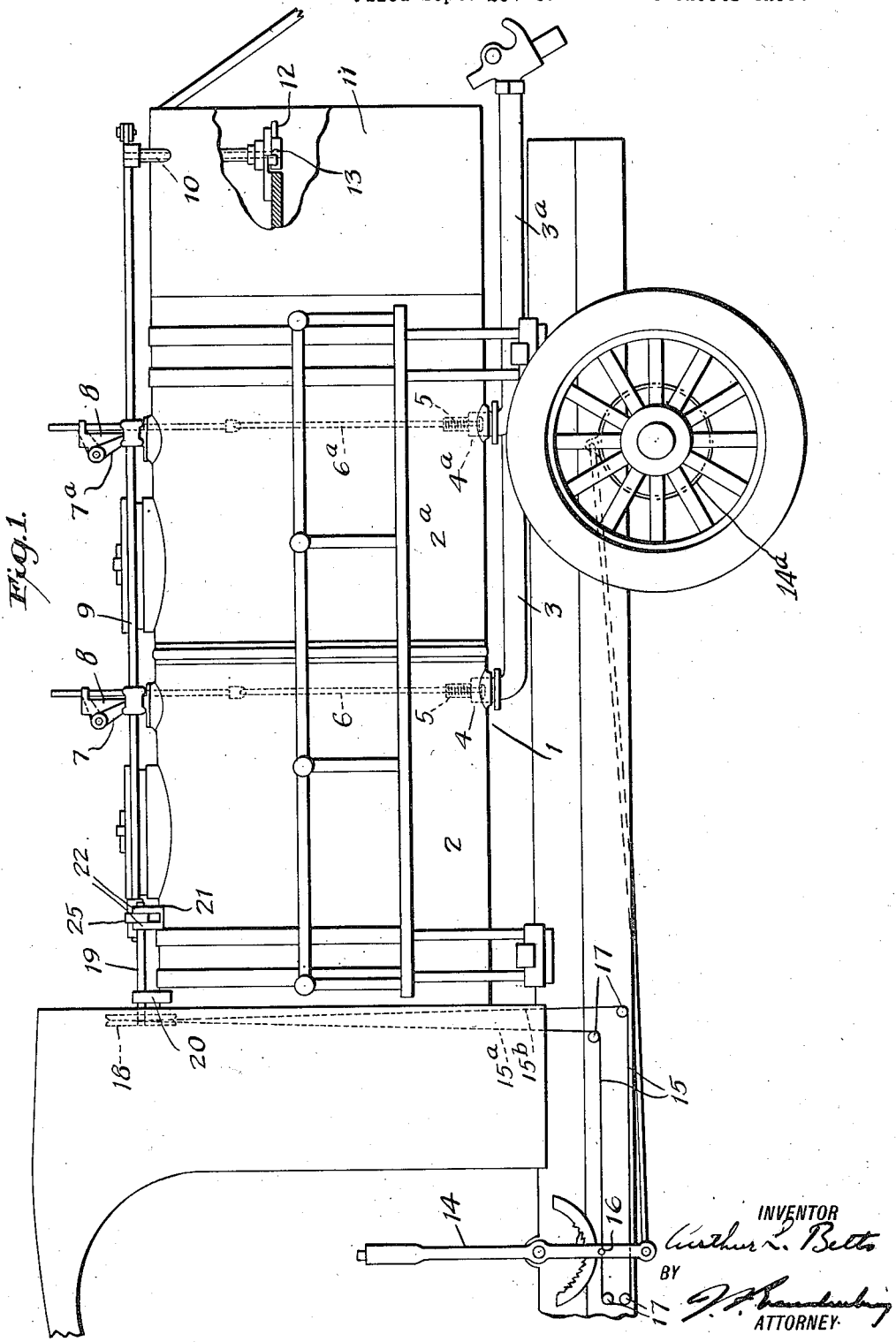

1,510,582

UNITED STATES PATENT OFFICE.

ARTHUR L. BETTS, OF CINCINNATI, OHIO, ASSIGNOR TO AUGUSTINE DAVIS, JR., OF COVINGTON, KENTUCKY.

TANK-VEHICLE SAFETY MECHANISM.

Application filed September 20, 1923. Serial No. 663,786.

*To all whom it may concern:*

Be it known that I, ARTHUR L. BETTS, a citizen of the United States, and a resident of Cincinnati, in the county of Hamilton and State of Ohio, have invented a new and useful Tank-Vehicle Safety Mechanism, of which the following is a specification.

The invention has to do with tank vehicles, such as tank trucks for transporting and dispensing oil, gasoline or like inflammable liquids. It has become customary to provide these tanks with spring-seated so-called emergency valves for closing the bottom outlets to the faucet piping, so that the discharge of liquid upon the street can be prevented in case of injury to the faucets or piping. It is important that these emergency valves be kept in good working condition by frequent operation, and the greatest degree of safety is insured when the valves must be opened each time before liquid is drawn off and closed again after each dispensing or delivery of oil or gasoline. A known plan calls for an interference or connection between an operating member of the valve mechanism and the door of the bucket-box at the rear end of the tank, so that the door can not be closed without the valve mechanism being closed. The driver would not ordinarily proceed without closing the door, and consequently with such a plan the valve mechanism will ordinarily be operated, but the operation is not absolutely compulsory.

The present invention aims to provide even better security, this being accomplished by means of an interlock between the emergency valve mechanism of the tank and the emergency brake mechanism of the vehicle, whereby, particularly, the brake mechanism, having once been set, can not be released as long as the valve mechanism is in the open condition. As is well known, a driver practically instinctively applies his emergency brake upon bringing his vehicle to rest, but for entire security the interlock is preferably so designed that in the first place the valve mechanism can not be opened until the brake is set and thereafter the brake can not be released as long as the valve mechanism is open.

Two embodiments of the invention are shown and described as illustrative of numerous possible forms of the interlock.

In the accompanying drawings forming a part hereof:

Fig. 1 is a side elevation of a tank vehicle, with portions broken away, having the invention applied thereto. It is to be understood that in this view the valves are open and the brake is set.

Fig. 2 is an enlarged plan view of parts at the forward end of the tank. The condition is the same as in Fig. 1, but in broken lines the control rod and its blade are shown in the normal position, that is to say when the valves are closed.

Fig. 3 is a transverse section on the line 3—3, broken lines being used to show the position of the part 25 when the brake is off.

Fig. 4 is a transverse sectional view showing an alternative construction. The parts are shown in the normal condition, that is to say the condition in which the valves are closed and the brake is off. Dotted lines illustrate the position of the part 250 when the brake has been applied.

Reference will first be had to Figs. 1 to 3. The tank 1 of the tank vehicle represented in the drawings comprises a plurality of compartments 2, 2ᵃ for different kinds of oil and gasoline, though this is not necessarily essential, and each compartment has a bottom outlet to a faucet piping 3, 3ᵃ. The bottom outlets are commanded by spring-closing emergency valves 4, 4ᵃ, their springs being marked 5. Connections 6, 6ᵃ extend upward through the interior of the tank and through openings in the top to connect with bell-cranks 7, 7ᵃ mounted in brackets 8. These bell-cranks cooperate with a common control rod 9 extending longitudinally over the top of the tank. This form of control rod is longitudinally movable, and its rear end is connected to a crank on the upper end of a vertical rock-shaft 10, which as a matter of convenience extends down into a bucket-box 11, where it has an operating handle 12. Rearward movement of this handle will draw rearward on the control rod 9, and thereby raise the emergency valves 4, 4ᵃ, unseating them against the action of their springs 5. The valves, when opened in this manner, will be held open by a suitable catch, such as a fixed bracket shoulder 13, against which a tail on the lever 12 can be caught in the manner disclosed in the application of Augustine Davis, Jr., and myself filed May 15, 1920, Serial No. 381,575, but such details may be varied. Upon disengaging the valve mechanism from such catch, the valves will be closed by their springs.

The hand lever for operating the emergency or hand brake 14ª for the vehicle wheels is indicated at 14.

This is sufficient representation of such brake mechanism since these matters are well understood and any suitable or known type of brake may be employed. It will be understood that the brake lever is pulled rearward to set or apply the brake, and that it is held by the usual ratchet segment and dog. Conversely, forward movement of the brake lever permits release of the brake. 15 is a cable having two ends, leads or parts which are shown connected to a point 16 on the brake lever, though the connection or connections may be made equally with other parts of the brake mechanism. The two leads 15ª, 15ᵇ of the cable pass about suitable pulleys 17, the number and position of which may be varied, to a drum 18 on a shaft 19, which is journaled in suitable bearings 20, 21 on the tank or vehicle. The leads are preferably fastened to the drum or wrapped around it one or more times to insure the desired operation. The rear bearing 21 is bifurcated or composed of spaced parts 22, the tops of which are preferably vertically and longitudinally slotted at 23 to accommodate and permit the movement of a blade 24 secured to and forming part of the control rod 9. Fixed to the shaft 19, between the bracket parts 22, is a part 25, preferably formed with a slot 26, adapted to align with the slots 23 in the bracket or bearing.

The relations are such that, when the emergency valves are closed and the emergency brake is off, the blade 24 stands just forwardly of the part 25, the part 25 then preferably opposing a solid obstacle to the rearward movement of the blade, so that the emergency valves can not be opened until the brake is set. When the brake is set, the part 25 is turned to a position which brings its slot 26 into line with the blade and with slots 23 in the bracket. The valve mechanism may now be operated to open the valves, and while the valves remain open the blade stands in the slot 26, being braced by the slotted bracket portions 22. Consequently as long as the valves stay open, the brake mechanism can not be operated to release the brake. When, however, the valve mechanism is operated to cause closing of the valves, the blade 24 will be moved forward to the original position, so that the part 25 is free to be turned laterally. The brake may then be released and the vehicle may be driven away. It is important to observe, therefore, that the brake having been set and the valve mechanism having been opened, the brake can not be released until the valve mechanism is again closed.

It will be apparent that the form of the parts of the interlock may be widely varied, and that the connection between the part 25 of the interlock and the brake may be a pull connection, as shown, or of other kinds. It will be seen that there is a positive connection from the brake lever to the interlock through the lead 15 acting in respect to the brake-releasing movement of the brake-mechanism. There is also preferably a positive connection through the lead 15ᵇ acting in respect to the brake-applying movement, but this may be varied, as a spring might be employed to move the part 25 when the brake is set.

Fig. 4 illustrates the application of the invention to a rotary oscillatory control rod 90. A lever handle 120 is shown, which when pulled down will unseat the valves. A catch for holding the mechanism in this condition is represented at 130. Arms 70 operated by the control rod act upon the valve connections 60. The slotted part 250, rock-shaft 190, drum 180, and cable 150 correspond to the parts marked 25, 19, 18 and 15 in the other construction. 240 is a blade connected with the control rod or other part of the valve mechansm. When the emergency brake of the vehicle is off and the valves are closed, the blade 240 is immediately opposed to the solid periphery of the part 250. When the brake is set the part 250 is automatically moved to bring its slot 260 into line with the blade. The control rod can then be turned clockwise to unseat the valves, and the blade will enter the slot, where it remains as long as the valves are held open. Consequently the brake can not be released until the valves are again closed.

What I claim as new is:

1. In a tank vehicle, the combination of brake mechanism for the vehicle, valve mechanism for the tank, and an interlock preventing release of the brake while the valve mechanism is in the open condition.

2. In a tank vehicle, the combination of brake mechanism for the vehicle, valve mechanism for the tank, and an interlock between the valve mechanism and the brake mechanism, comprising a part cooperative with a part of the valve mechanism and connected and actuated with the brake mechanism, to offer an obstacle to the opening of the valve mechanism when the brake is off, and when the brake is applied and the valve mechanism is open to prevent release of the brake as long as the valve mechanism remains open.

3. In a tank vehicle, the combination of brake mechanism for the vehicle, valve mechanism for the tank, and an interlock between the valve mechanism and the brake mechanism, comprising a part actuated positively by the brake mechanism when the latter is moved to release the brake, whereby the brake mechanism can not be released until the valve mechanism has been closed.

4. In a tank vehicle, the combination of brake mechanism for the vehicle, valve mechanism for the tank, and an interlock between the valve mechanism and the brake mechanism, comprising a part cooperative with the valve mechanism and having positive connection with the brake mechanism in respect to its operation in both directions.

ARTHUR L. BETTS.